United States Patent [19]

Sakai et al.

[11] Patent Number: 4,575,768
[45] Date of Patent: Mar. 11, 1986

[54] CONVERSION TO A TWO-VALUED VIDEO SIGNAL

[75] Inventors: Toshiyuki Sakai, Takatsuki; Yoshihiro Okada, Nara; Masatoshi Hino, Onomichi; Yuichi Ohta, Takatsuki, all of Japan

[73] Assignee: Ricoh Company, Ltd., Tokyo, Japan

[21] Appl. No.: 476,218

[22] Filed: Mar. 17, 1983

[30] Foreign Application Priority Data

Mar. 18, 1982 [JP] Japan ................................. 57-43085
Apr. 22, 1982 [JP] Japan ................................. 57-67802

[51] Int. Cl.$^4$ .............................................. H04N 1/40
[52] U.S. Cl. ..................................... 358/282; 358/280
[58] Field of Search ....................... 358/280, 282, 284; 382/52, 53

[56] References Cited

U.S. PATENT DOCUMENTS

3,534,334 10/1970 Bartz et al. .............................. 382/52
3,723,649 3/1973 Pitegoff et al. ...................... 358/280
3,763,357 10/1973 Morton ................................. 382/53
4,251,837 2/1981 Janeway ............................... 358/282

Primary Examiner—James J. Groody
Assistant Examiner—John K. Peng
Attorney, Agent, or Firm—Guy M. Shoup

[57] ABSTRACT

A system for converting an analog video signal obtained by scanning an original image to be processed into a two-valued video signal such as an input portion of a facsimile machine includes a peak/valley extracting circuit for extracting peaks and valleys in the analog video signal before thresholding the analog video signal so as to determine an optimal threshold level to be used in thresholding. The peak/valley extracting circuit includes peak and valley thresholds in addition to the threshold to be used in thresholding the analog video signal to produce a two-valued video signal. The peak/valley extracting circuit is so structured to supply a peak/valley extraction signal if an extracted peak or valley also satisfies the condition that it is equal to or higher or lower in level than the peak or valley threshold.

5 Claims, 10 Drawing Figures

CONVERSION TO A TWO-VALUED VIDEO SIGNAL

BACKGROUND OF THE INVENTION

1. Field of the Invention

This invention generally relates to image processing, and, in particular, to an analog-to-digital image conversion technique. More specifically, it relates to a system for converting an analog image signal obtained by scanning an object or scene into a two-valued image or video signal.

2. Description of the Prior Art

In a facsimile machine and the like, an object or scene is scanned by an image sensor to obtain an analog image or video signal and then it is converted into a two-valued video signal prior to further processing such as compression and modulation. In order to obtain such a two-valued video signal, the technique called thresholding or threshold processing is commonly applied; however, in accordance with a simple threshold processing, some delicate information in the original image will be lost. For example, narrow lines in the original image will disappear, or fine portions to be represented as "black" areas are shown as "white" areas instead, and narrow gaps or spacings between lines will disappear, or fine portions to be represented as "white" areas are shown as "black" areas. One of the reasons for this is that since a sampling spot used by an image sensor for scanning an original image is finite in size, the video signal does not change abruptly or stepwise at the boundary between the black and white portions in the original image so that the wave shape of the resulting video signal becomes rather dull.

Figure 1:
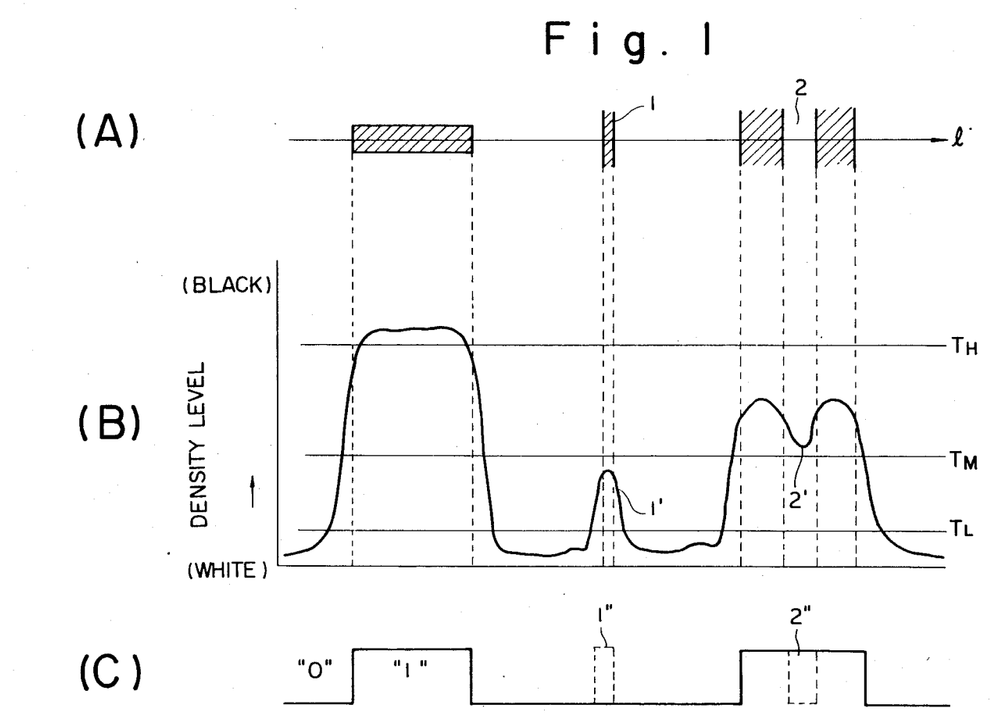
FIG. 1 is a schematic illustration useful for explaining the occurrence of disappearance of the image information as to narrow lines and narrow gaps between lines during the conversion process into a two-valued video signal.

For example, when the image pattern shown in FIG. 1(A) is scanned along the straight line 1, the resulting video signal will have the wave shape as indicated in FIG. 1 (B). If this video signal is processed by application of thresholding at level $T_M$, the portion 1' of the video signal which corresponds to the narrow line 1 in the original image and the portion 2' of the video signal which corresponds to the narrow gap 2 in the original image will disappear, so that the resulting two-valued video signal will take the form as shown in FIG. 1(C) in which the portions 1" and 2" have false image information.

In order to cope with such a problem, a typical prior art approach is to carry out the operation of emphasizing the hiqh frequency components of the analog video signal prior to the application of thresholding. However, such an emphasizing operation is not applicable to narrow lines and narrow gaps extending in parallel with the main scanning direction, or the direction of optical scanning direction, of an image sensor and it is also susceptible to noises.

SUMMARY OF THE INVENTION

It is a primary object of the present invention to obviate the above-described disadvantages of the prior art image processing techniques and to provide a novel image processing technique for converting an analog video signal into a two-valued video signal without losing image information, even if it is delicate. In accordance with the present invention, a digitized video signal which is obtained by scanning an original image and which is to be converted into a two-valued video signal is observed through a predetermined window to extract peaks and valleys in the digitized video signal, which are the two-dimensional characteristic structural information of line images, and the digitized video signal is converted into a two-valued video signal such that the extracted peaks and valleys are faithfully reflected in the resulting two-valued video signal as much as possible.

The extraction of such peaks and valleys through a predetermined window is disclosed in the U.S. patent application, Ser. No. 405,766, U.S. Pat. No. 4,525,747, which is incorporated by reference. In accordance with one aspect of the present invention, there is provided a system for converting analog video signal into a two-valued image signal which is characterized by selecting a threshold level which is optimum in having the extracted peaks and valleys reflected in the resulting two-valued video signal as faithfully as possible. For example, as disclosed in the above-mentioned patent application, in extracting peaks and valleys, an observation window having a predetermined two-dimensional size, for example 3 picture elements in row by 3 picture elements in column, is used and a picture element of interest, or the picture element at center in a 3 by 3 window, is examined whether it has a maximum or minimum density as compared with the adjacent two picture elements on both sides in a line in two or more different directions. If the picture element of current interest is found to have a maximal or minimal image density in two or more directions, then it is extracted as a peak or valley. However, under such peak/valley extracting conditions, in the case where the background of an original image is colored, the quality of an original document is inferior, or an original document is relatively thin and/or transparent, false peaks may be extracted from the background portion which does not constitute an image and similarly false valleys may be extracted from a large continuous image area as noises.

Thus, in accordance with one aspect of the present invention, thresholding is applied to the extracted peaks to finally determine those among the extracted peaks whose levels are at least as high as a predetermined peak threshold level $T_H$ (see FIG. 1) as real peaks; similarly, thresholding is also applied to the extracted valleys to finally determine those among the extracted valleys whose levels are at least as low as a predetermined valley threshold level $T_L$ (see FIG. 1). By applying thresholding with these two threshold levels $T_H$ and $T_L$ to the extracted peaks and valleys as additional conditions in extracting real peaks and valleys, false peaks and valleys may be removed and thus the excellence in quality of the resulting two-valued video signal is insured. It is preferable that the peak and valley threshold levels $T_H$ and $T_L$ are made variable depending upon the quality of an original image to be processed.

In accordance with another aspect of the present invention, there is provided a system for converting an analog video signal into a two-valued video signal which is characterized by carrving out a pre-treatment prior to the step of converting into a two-valued video signal in order to enhance the quality of the resulting signal.

Other objects, advantages and novel features of the present invention will become apparent from the following detailed description of the invention when considered in conjunction with the accompanying drawings.

DESCRIPTION OF THE PREFERRED EMBODIMENTS

Figure 2:
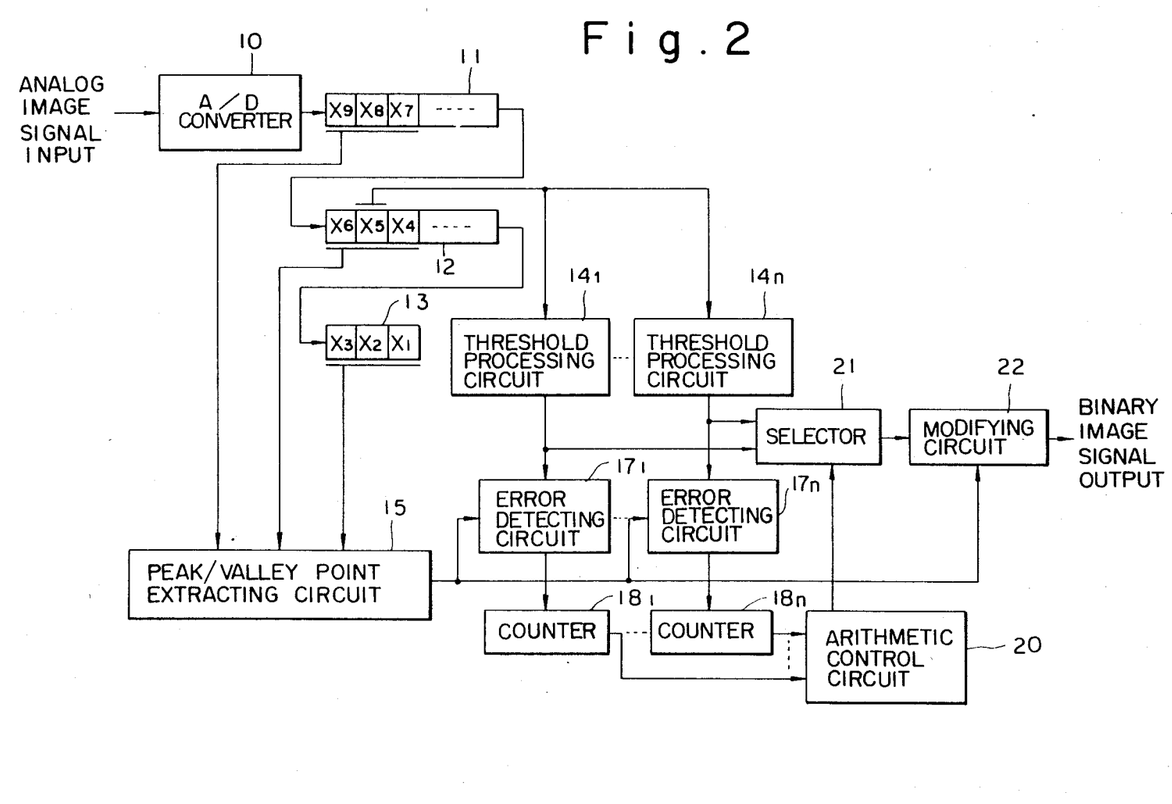
FIG. 2 is a block diagram showing one embodiment of the present invention in which thresholding is carried out to the extracted peaks and valleys to exclude false peaks and valleys.

Referring now to FIG. 2, showing an embodiment of the present system for converting an analog image or video signal into a two-valued video signal, an analog image signal obtained, for example, by scanning an original image to be processed by means of an image sensor of a facsimile machine is supplied to an A/D (analog-to-digital) converter 10 where the analog video signal thus supplied is digitized and converted into a multi-level digital video signal. The digitized video signal is then supplied to the leftmost bit of a shift register 11 one picture element after another, and the digital data thus supplied is shifted to the right within the shift register 11 in accordance with a clock signal applied thereto. The output at the rightmost bit of the shift register 11 is connected to the leftmost bit of the next stage shift register 12, so that the data is transferred to the second stage shift register 12 from the first stage shift register 11 and shifted to the right in accordance with clock pulses. Similarly, the rightmost bit of the second stage shift register 12 is connected to the leftmost bit of the third stage shift register 13 and thus the digital data may be transferred to the third stage shift register 12 from the second stage shift register 12 as shifted by clock pulses. The digital data as shifted are discarded from the rightmost bit of the third stage shift register 13. In the illustrated example, the first and second shift registers 11 and 12 have so many bits corresponding in number to the picture elements (pixels) in a single scanning line to be scanned by an image sensor; on the other hand, the third shift register 13 has only three bits. The third shift register 13 may have more bits, if desired.

The left three bits $X_7$ through $X_9$ of the first stage shift register 11, the left three bits $X_4$ through $X_6$ of the second stage shift register 12 and the three bits of the third stage shift register 13 define an observation window, which will be described more fully later. The bit $X_5$ in the second stage shift register 12 constitutes a bit of interest, and the digitized video data when shifted into the bit $X_5$ is compared with the adjacent bits to determine whether or not it is a local peak or valley. The digitized video data shifted into the bit $X_5$ is also supplied to a group of threshold processing circuits $14_1$ through $14_n$ at the same time. Each of the threshold processing circuits $14_1$ through $14_n$ has its own threshold level, $T_M$ in FIG. 1, which is different in level from the thresholds of the other circuits. Each of these threshold processing circuits supplies "1" (black) as its output when the data supplied from the bit $X_5$ is equal to or higher in level than its threshold. On the other hand, the threshold processing circuits $14_1$ through $14_n$ supply "0" (white) as outputs when their thresholds are higher in level than the data supplied from the bit $X_5$.

The digitized video data, which also indicate the density or concentration of picture elements, contained in the bit of interest $X_5$ and its surrounding bits $X_1$ through $X_4$ and $X_6$ through $X_9$ are all supplied as inputs to a peak/valley point extracting circuit 15 in parallel where extraction of peak or valley is carried out. Such an extracting operation will be described with reference to FIG. 3.

Figure 3A:
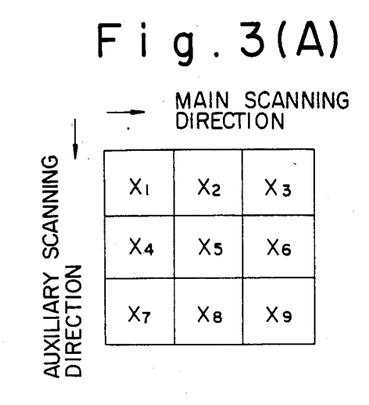
FIGS. 3(A) and 3(B) are schematic illustrations showing in principle a two-dimensional window for extracting peaks and valleys from a digitized video signal in accordance with the present invention.
Figure 3B:
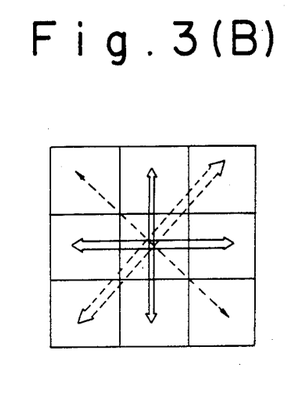

It is apparent that the positional relation among the picture elements whose digitized video data are supplied to the peak/valley point extracting circuit 15 is as shown in FIG. 3(A). In FIG. 3(A), the horizontal direction corresponds to the main scanning direction along which optical scanning is carried out, so that in the case of an image sensor including a plurality of photoelectric elements arranged in the form of a single array, the lengthwise direction of the array corresponds to the main scanning direction. The vertical direction in FIG. 3(A) corresponds to the auxiliary scanning direction and it is the direction of relative movement between an original image to be processed and the image sensor. Thus, these nine bits or picture elements define an 3 bit by 3 bit observation window for examining whether or not the center bit $X_5$ is a peak or valley. In accordance with this embodiment of the present invention, the peak/valley extracting circuit 15 is so structured that only when the bit of interest or center bit $X_5$ is found to possess the density level which is equal to or higher than a predetermined peak threshold level $T_H$ or equal to or lower than a predetermined valley threshold level $T_L$, the data in the center bit $X_5$ is compared in density level with the data in each of the eight adjacent bits in four directions each different in angle by 45°, thus two adjacent bits at the same time, as shown in FIG. 3(B).

Accordingly, under the condition that the data in the center bit $X_5$ is higher in density level than a predetermined peak threshold level $T_H$, when the data in the center bit $X_5$ has been found to have a density level which is higher than any of the oppositely positioned two adjacent bits in two different directions, the data in the center bit $X_5$ is extracted as a peak by the circuit 15. For example, if it has been found that the data in the center bit $X_5$ is higher in density level than any of the data contained in the oppositely located two bits $X_4$ and $X_6$ in one direction as well as the data contained in the oppositely located two bits $X_2$ and $X_8$ in another direction, then the data in the center bit $X_5$ is extracted as a real peak. On the other hand, if the data contained in the center bit $X_5$ has been found to have the density level which is lower than any of the data contained in these bits $X_2$, $X_4$, $X_6$ and $X_8$, then the data contained in the center bit $X_5$ and thus its corresoonding picture element is extracted as a valley. In the latter case, it is also true that the data contained in the center bit $X_5$ must satisfy the condition that it is equal to or lower than a predetermined valley threshold level $T_L$. In the case where the data contained in the center bit $X_5$ is higher in density level than the data contained in four of the surrounding eight adjacent bits in two directions and at the same time it is lower in density level than the data contained in the remaining four adjacent bits in the other two directions, the data in the center bit $X_5$ is extracted neither as a peak nor as a valley.

Returning to FIG. 2, the analog-to-digital video signal converting system of the present invention further includes a plurality of error detecting circuits $17_1$ through $17_n$. These error detecting circuits $17_1$ through $17_n$ are so structured to supply peak error signals when they receive "0" level signals from the corresponding threshold processing circuits $14_1$ through $14_n$ even if the peak/valley extracting circuit 15 supplies a peak signal as its output and, on the other hand, to supply valley error signals when they receive "1" level signals from the corresponding threshold processing circuits $14_1$ through $14_n$ even if the circuit 15 supplies an extracted valley signal as its output. These peak and valley error signals are supplied to the corresponding counters $18_1$ through $18_n$ in each of which the counts of peak errors and valley errors are separately stored.

Figure 4:
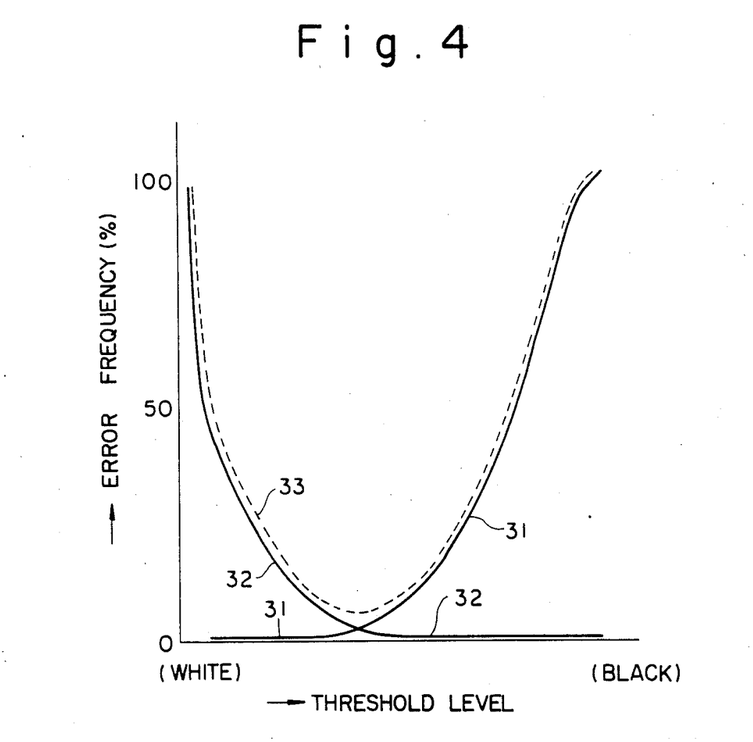
FIG. 4 is a graph showing the relation between the threshold level and the peak or valley error frequency.

Each of the counters $18_1$ through $18_n$ is connected to an arithmetic control circuit 20 which determines which of the threshold processing circuits $14_1$ through $14_n$ has caused a minimum number of peak and valley errors on the basis of the counts in the counters $18_1$ through $18_n$. That is, the arithmetic control circuit 20 selects an optimum threshold for thresholding the digitized video signal. In this connection, a more detailed description will be made with reference to the graph shown in FIG. 4. That is, FIG. 4 shows the relation between the threshold level in abscissa and the peak and valley error frequency in ordinate. In the graph of FIG. 4, the curve 31 indicates the percentage of number of peak errors against the total number of peaks; whereas, the curve 32 indicates the percentage of number of valley errors against the total number of valleys. In addition, the curve 33 indicates the percentage of a simple sum between peak and valley errors against the total number of peaks and valleys.

The arithmetic control circuit 20 reads in the counts of peak and valley errors from the counters $18_1$ through $18_n$ for every single scanning line or every predetermined section, and it selects the optimum threshold and thus one of the threshold processing circuits $14_1$ through $14_n$ having the optimum threshold for making the number of errors minimum on the basis of the error information just read in and the error information for several other scanning lines which is thus far stored therein. In principle, the threshold processing circuit 14 whose threshold level is closest to the threshold level at the minimum point of the curve 33 in FIG. 4 is selected as the optimum one. Experimentally, however, the quality of a reproduced image generally appears to be better when the threshold processing circuits $14_1$ through $14_n$ are selected on the basis of a minimum point in the weighted sum between peak errors and largely weighted valley errors, though the two-valued video signal tends to lose some information for thin lines. It is to be noted that the counters $18_1$ through $18_n$ are reset by the arithmetic control circuit 20 for every scanning line or every predetermined section.

The system of FIG. 2 also includes a selector 21 which is connected to each of the threshold processing circuits $14_1$ through $14_n$ and also to the arithmetic control circuit 20. The selector 21 selectively allows to pass only one of the output signals (two-valued video signals) from the respective threshold processing circuits $14_1$ through $14_n$ as selected by the arithmetic control circuit 20 to a modifying circuit 22. The function of the modifying circuit 22 is such that, for the picture element for which the extracting circuit 15 has supplied an peak extraction signal, the level of the two-valued signal thus input is forcibly modified to "1" (black) level before being supplied as an output. Similarly, the modifying circuit 22 functions such that it forcibly modifies the level of the two-valued video input signal to "0" (white) level for the picture element for which the extracting circuit 15 has supplied a valley extraction signal before supplying it as an output. For those picture elements for which neither peak not valley extraction signals have been issued by the extracting circuit 15, the modifying circuit 20 allows the inputting two-valued video signal to be supplied as an output without changes or modifications.

In the above-described video signal converting system, the analog video signal from an image sensor is once converted into a multi-level digital video signal by means of the A/D converter 10 and then the thus quantized video signal is subjected to thresholding and peak/valley extracting operations. However, it may also be so structured that the analog video signal from an image sensor is directly subjected to thresholding and peak/valley extracting operations as an alternative form. Furthermore, in the above-described embodiment of the present invention, a plurality of threshold processing circuits $14_1$ through $14_n$ are provided to carry out the multiple thresholding operations at the same time. Instead, provision may be made of a single threshold processing circuit which is so structured that its threshold level is directly controlled. In this case, the selector 21 may be removed. The above-described embodiment is so structured to carry out both of the optimization of thresholding and the modification of a two-valued video signal. It should be noted, however, that the present invention may be so structured to carry out either one of the optimization of thresholding or modification processing.

In accordance with the peak/valley extracting method described above, extraction of peaks and valleys cannot be made for fat lines and wide gaps between lines where no high spatial frequency components are involved. However, since disappearance of image information usually occurs for thin lines and narrow gaps between lines, it is generally satisfactory from the view point of image processing if peaks and valleys are extracted for those portions where high spatial frequency components are involved.

Figure 5:
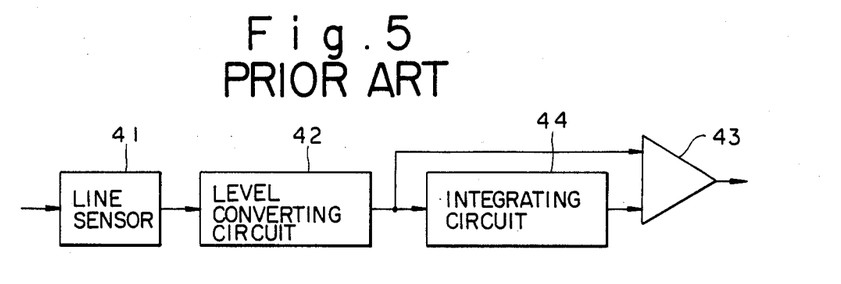
FIG. 5 is block diagram showing a prior art system for converting an analog video signal into a two-valued video signal.

FIG. 5 shows a typical prior art system for obtaining a two-valued video signal, which is used, for example, as an input section of a facsimile and the like. In this system, an original image to be processed is scanned by a line sensor 41 forming a photoelectric signal converter thereby converting light information of the light and dark pattern of the original image into an analog electrical video signal by carrying out sampling for each of the picture elements on the original image. The thus produced analog video signal is level-shifted by a level shifting circuit 42 and then it is supplied as an input to a comparator 43. The level-shifted analog video signal is also supplied to an integrating circuit 44 where a threshold level to be used in the converting to a two-valued signal operation is produced and then supplied to the comparator 43.

Figure 6:
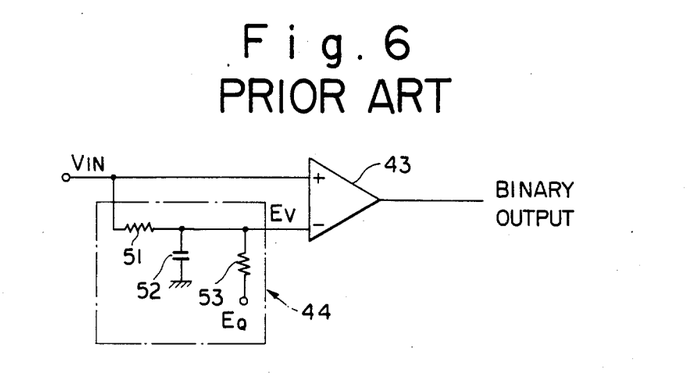
FIG. 6 is a circuit diagram showing one example of the detailed structure of the integrating circuit employed in the system of FIG. 5.
Figure 7:
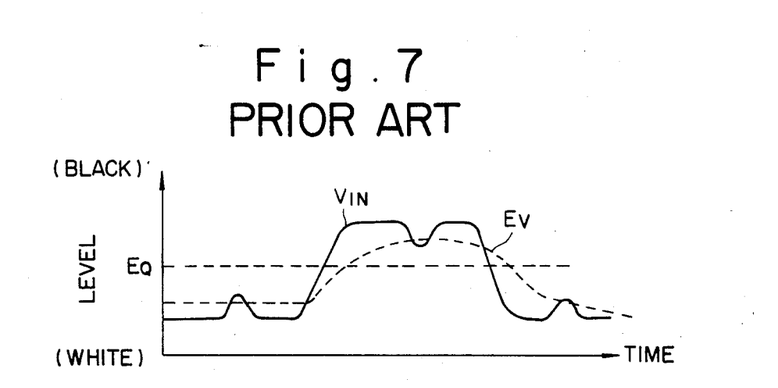
FIG. 7 is a graph showing the input and output characteristics of the integrating circuit of FIG. 6.

FIG. 6 shows the detailed structure of one example of the integrating circuit 44, and it includes a resistor 51 and a capacitor 52 for integrating the level-shifted analog video signal $V_{IN}$. Also provided is a resistor 53 for controlling the charging and discharging of the capacitor 52. In order to make the potential $E_V$ at the non-grounded plate of the capacitor 52, i.e., the threshold level for binary value conversion, to be semi-fixed, one end of the resistor 53 is connected to a predetermined potential $E_Q$. When the integrating circuit of FIG. 6 is used, for the input signal $V_{IN}$ which varies as indicated by the solid line in FIG. 7, the signal $E_V$ changes with generally following the changes of $V_{IN}$ as indicated by the dotted line also in FIG. 7.

However, in the prior art binary value conversion system as described above, there are instances where a two-valued video signal to which the essential image information of an original image is sufficiently reflected cannot be obtained. That is, the threshold level for binary value conversion obtained by the integrating circuit cannot follow the dynamic changes in density level of the background portion of the original image. For this reason, it tends to loose delicate information as to dark and light pattern of the original image. For example, the information of thin lines and of narrow gaps between lines may be partly or wholly lost. Besides, in the case of an original image which partly includes a picture or a blueprint, the control of the threshold level for binary value conversion cannot be carried out appropriately.

Figure 8:
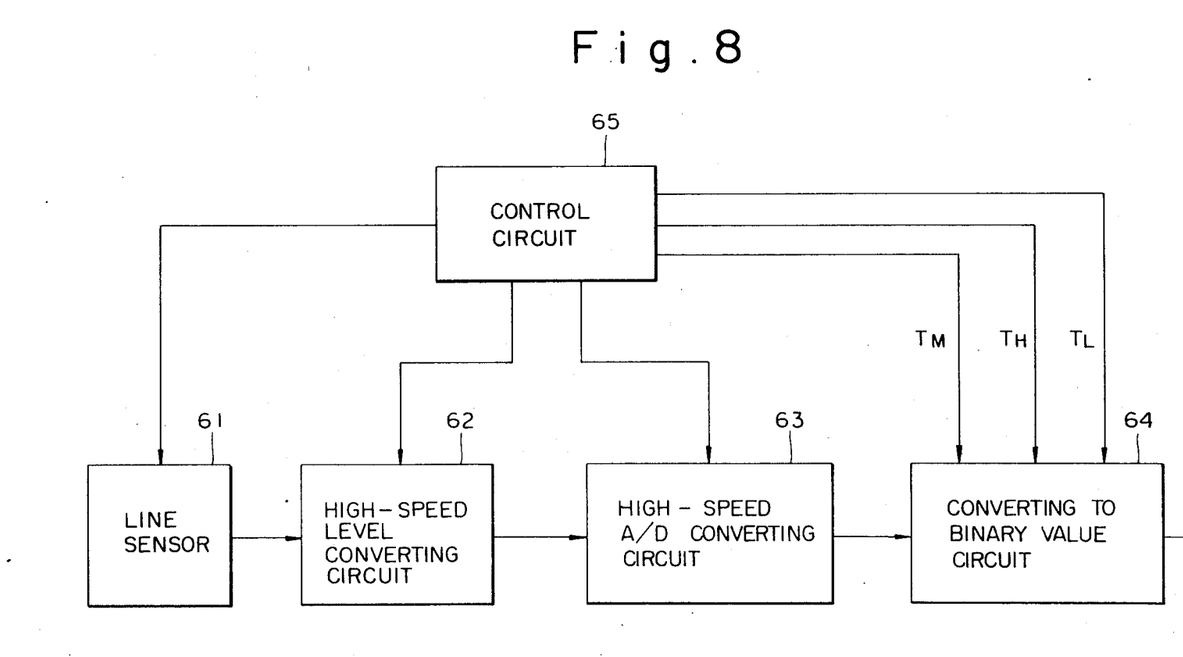
FIG. 8 is a block diagram showing a system for converting an analog video signal into a two-valued video signal, in which pretreatment is carried out prior to the step of conversion into a two-valued video signal, constructed in accordance with the present invention.

FIG. 8 shows one embodiment of the present invention which has obviated the above-described defects of the prior art. As shown, the system of FIG. 8 includes a line sensor 61 for raster scanning an original image to convert the dark and light pattern of the original image into an analog video signal. The analog video signal is then supplied to a high-speed level shifting circuit (driver) 62 where the analog video signal supplied is shifted in level. The level shifting or converting circuit 62 may be comprised of a high-speed analog circuit, for example, having the speed of 1,000 V/micro secs. Then the level-shifted analog video signal is converted into a multi-level digital video signal through a high-speed A/D (analog-to-digital) converter 63, which is then supplied as an input to a converting to a binary value (and modifying) circuit 64. For this conversion circuit 64, use may be made of the circuit disclosed in the above-raised patent application. In the preferred structure of the conversion circuit 64, it functions to convert the inputting multi-level digital video signal into a two-valued video signal using such a threshold level which will make the occurrence of peak and valley errors minimized and to modify the thus produced two-valued video signal with respect to the peak and valley errors thereby supplying the thus modified two-valued video signal as a final output. Also provided in the system of FIG. 8 is a control circuit 65 which controls the operation of each of the circuits 61 through 64, and, in particular for the binary value conversion circuit 64, it supplies a peak threshold $T_H$ and a valley threshold $T_L$ whereby these two thresholds are used to control the overall threshold $T_M$.

Incidentally, these three thresholds $T_H$, $T_M$ and $T_L$ are varied dynamically in accordance with the nature or quality of an original image thereby allowing to carry out the optimum conversion to a two-valued video signal. For example, the technique disclosed in the Japanese Patent Application No. 57-45298, filed on Mar. 20, 1982, may be used for this purpose. The disclosure of this patent application is hereby incorporated by reference.

Figure 9:
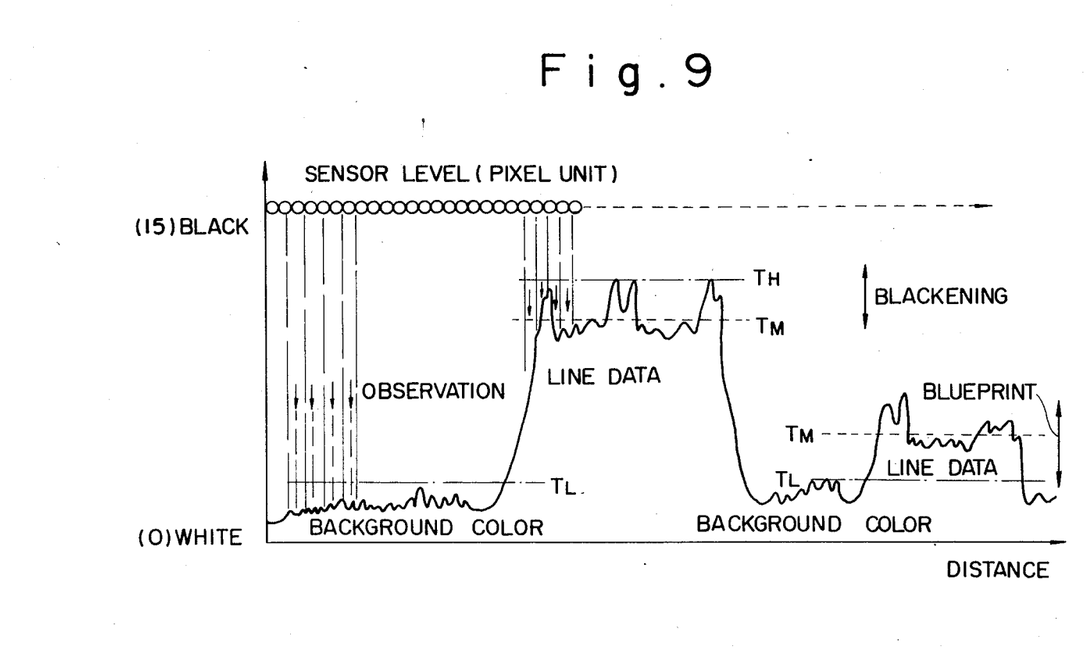
FIG. 9 is a graph showing an example of the density distribution of an original image to be processed.

Referring now to FIG. 9, the operation of the system shown in FIG. 8 will be described in detail. FIG. 9 shows the density distribution of an original image to be processed when viewed in the direction of the main scanning direction which is taken as the abscissa in the graph of FIG. 9. In the case where the original image to be processed is a blueprint, the density of background portion is relatively high. Suppose that the gray scale from "white" to "black" is to be converted into multi-level digitized quantities by an A/C converter in 4 bits. Then, there exist 16 digital levels different in density with the "0" level corresponding to "white" and the "15" level corresponding to "black". In this case, for line images and characters, due to the characteristic at the time of their formation, when processed by the high-speed level converting circuit 62, the edge portion of a line is emphasized thereby increasing its level. On the other hand, since the background color has received the developing treatment, even if the edges of a cluster of concentration are emphasized, there occurs almost no increase in level. For this reason, the dynamic range for the image and background is expanded and there is obtained a level shifted video signal retaining therein a minute or delicate pattern structure existing in the original image. For example, as indicated by "Blueprint" in FIG. 9, if the threshold level $T_L$ is set at the level "7", peaks may be extracted by thresholding with a threshold $T_M$, so that the information of line images and characters may be well preserved in the converted binary video signal. It has been found experimentally that the threshold level $T_M$ floats around the levels "7", "8", "9", "10" and "11." On the other hand, for baldfaced characters, fat lines drawn by a brush, heavily painted regions and corrupted character image patterns, the scanned video signal will appear as indicated by "Blackening" in the graph of FIG. 9. However, by setting a valley threshold level at $T_H$, the portions of the video signal lower in level than the threshold level $T_M$ will appear as "white" portions, so that even if it is a real black or fat line region, its image structure may be well preserved in the converted binary video signal.

The peak and valley threshold levels may be set manually, interactively as in the training area of a remote sensing image, or automatically in accordance with the color of the background portion, the color of paper, or the color of image. Moreover, the threshold $T_M$, which is located between the peak and valley thresholds and which is to be used in the converting operation to obtain a two-valued video signal, may be set floating and made variable in level depending upon the region in the original image as shown in FIG. 9. When so structured, there is provided an adaptable binary conversion system for converting an analog video signal into a two-valued video signal. That is, such a binary conversion system is not influenced by the properties of an original whether it is a drawing, graph or photograph since it carries out the pretreatment before thresholding utilizing three threshold levels as described above.

The high-speed A/D converter 63 must be at least comparable in high-speed characteristic to the high-speed level converting circuit 62 so as not to mitigate the expanded effects of the dynamic range of the level-shifted signals. On the other hand, if the converting to binary value circuit 64 is structured as disclosed in the Japanese Patent Applications Nos. 56-123303, 56-123304, the high-speed A/D converting circuit 63 may be discarded, and thus the analog output from the high-speed level converting circuit 62 may be directly fed into the binary conversion circuit 64.

As described above, in accordance with the system disclosed in FIG. 8, an analog video signal is first converted into a level-shifted analog video signal whose dynamic range between "image" and "background" is expanded by means of a high-speed level shifting or converting circuit 62 and the thus level-shifted video signal is then supplied, either through a high-speed A/D converting circuit 63 or directly, to a converting to binary value (and modifying) circuit 64 thereby obtaining a two-valued video signal through the pretreating operation using peaks and valleys and the thresholding operation using three thresholds different in level. As a result, in accordance with this system, a two-valued video signal of excellent quality may be obtained even for those originals to be processed which include fuzzy or corrupted images or which include in part blueprints, photographs and the like.

While the above provides a full and complete dislosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A system for converting an analog video signal obtained by scanning an original image to be processed into a two-valued video signal, comprising:
   an analog-to-digital converting means for converting said analog video signal into multi-level digital video data;
   arranging means for arranging said multi-level digital video data in a predetermined arrangement when said multi-level digital video data are supplied thereto sequentially, said arranging means including an observation window haying a first location, accommodating one of said multi-level digital video data, and a plurality of second locations, each accommodating another of said multi-level digital video data;
   peak/valley extracting means connected to said arranging means for extracting peaks and valleys from said multi-level digital video data, said peak/-valley extracting means supplying a peak extraction signal when said one data in said first location has a density level which is equal to or higher than a predetermined peak threshold level and at the same time said data in said first location is higher in density level than any of a first predetermined number of data among said data in said plurality of second locations, and said peak/valley extracting means supplying a valley extraction signal when said one data in said first location has a density level which is equal to or lower than a predetermined valley threshold level and at the same time said data in said first location is lower in density level than any of a second predetermined number of data among said data in said plurality of second locations;
   threshold processing means connected to receive said data in said first location for thresholding said data to supply a binary output as said two-valued video signal; and
   control means connected to receive said peak/valley extraction signal from said peak/valley extracting means and said binary output from said threshold processing means for controlling the level of a threshold to be used in said threshold processing means.

2. A system of claim 1 further comprising modifying means to which said binary output from said threshold processing means is supplied as an input signal, said modifying means forcibly changing the binary state of its input signal in response to said peak/valley extraction signal from said peak/valley extracting means thereby supplying the thus modified binary output as said two-valued video signal of said system.

3. A system of claim 1 wherein said threshold processing means includes a plurality of threshold processing circuits each having a different threshold level, and said system further comprises selecting means for selecting one of said threshold processing circuits in response to a selection signal supplied from said control means.

4. A system of claim 3 wherein said control means includes a like plurality of error detecting circuits each connected to receive said peak/valley extraction signal from said peak/valley extracting means and to receive said binary output from the corresponding one of said plurality of threshold processing circuits for supplying a peak or valley error signal depending upon comparison between said peak/valley extraction signal and said binary output, a like plurality of counters, each connected to the corresponding one of said plurality of error detecting circuits and each storing peak and valley error counts separately, and an arithmetic control circuit connected to receive said peak and valley error counts from each of said plurality of counters for determining which of said counters has minimum error counts and supplying said selection signal based thereon.

5. A system for obtaining a two-valued video signal from an original image to be processed, comprising:
   photoelectric signal converting means for converting the dark and light pattern of said original image into an analog video signal by sampling said pattern picture element by picture element;
   level shifting means for shifting the level of said analog video signal to produce a level-shifted analog video signal whose dynamic range is expanded by having the edge portions of lines in said original image emphasized;
   means for converting said level-shifted analog video signal into said two-valued video signal; and
   control means for dynamically controlling first, second and third thresholds different in level to be supplied to said means for converting for use in the conversion process in response to the properties of said analog video signal, said first and third thresholds being used to set peak and valley threshold levels and the level of said second threshold to be used in the thresholding operation for thresholding said level-shifted analog video signal in said means for converting being controlled by said first and third thresholds, whereby the thresholding may be carried out varyingly depending upon the local properties of said original image to be processed.

* * * * *